United States Patent
Oved et al.

(10) Patent No.: US 11,620,245 B2
(45) Date of Patent: Apr. 4, 2023

(54) MULTI-SOCKET NETWORK INTERFACE CONTROLLER WITH CONSISTENT TRANSACTION ORDERING

(71) Applicant: MELLANOX TECHNOLOGIES, LTD., Yokneam (IL)

(72) Inventors: Tzahi Oved, Ramat Gan (IL); Achiad Shochat, Rosh Pina (IL); Liran Liss, Atzmon (IL); Noam Bloch, Bat Shlomo (IL); Aviv Heller, Rishon LeZion (IL); Idan Burstein, Akko (IL); Ariel Shahar, Jerusalem (IL); Peter Paneah, Nesher (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/503,392

(22) Filed: Oct. 18, 2021

(65) Prior Publication Data

US 2022/0358063 A1    Nov. 10, 2022

Related U.S. Application Data

(60) Provisional application No. 63/186,124, filed on May 9, 2021.

(51) Int. Cl.
*G06F 13/28*    (2006.01)
*G06F 3/06*    (2006.01)

(52) U.S. Cl.
CPC .............. *G06F 13/28* (2013.01); *G06F 3/061* (2013.01); *G06F 3/0655* (2013.01); *G06F 3/0673* (2013.01); *G06F 2213/28* (2013.01)

(58) Field of Classification Search
CPC ........ G06F 13/28; G06F 3/061; G06F 3/0655; G06F 3/0673; G06F 2213/28
See application file for complete search history.

(56) References Cited

U.S. PATENT DOCUMENTS 5,761,448 A    6/1998  Adamson et al.
6,658,448 B1   12/2003 Stefaniak et al.
(Continued)

FOREIGN PATENT DOCUMENTS

WO    WO-2013048409 A1 *  4/2013  ....... G06F 15/17331

OTHER PUBLICATIONS

PCI Express® Base Specification, Revision 3.1, pp. 1-1073, Mar. 2014.

(Continued)

*Primary Examiner* — Idriss N Alrobaye
*Assistant Examiner* — Ronald T Modo
(74) *Attorney, Agent, or Firm* — Kligler & Associates Patent Attorneys Ltd (57) ABSTRACT

Computing apparatus includes a host computer, including at least first and second host bus interfaces. A network interface controller (NIC) includes a network port, for connection to a packet communication network, and first and second NIC bus interfaces, which communicate via first and second peripheral component buses with the first and second host bus interfaces, respectively. Packet processing logic, in response to packets received through the network port, writes data to the host memory concurrently via both the first and second NIC bus interfaces in a sequence of direct memory access (DMA) transactions, and after writing the data in any given DMA transaction, writes a completion report to the host memory with respect to the given DMA transaction while verifying that the completion report will be available to the CPU only after all the data in the given DMA transaction have been written to the host memory.

20 Claims, 6 Drawing Sheets

(56) References Cited

U.S. PATENT DOCUMENTS

| | | | |
|---|---|---|---|
| 7,346,702 | B2 | 3/2008 | Haviv |
| 7,467,243 | B2 | 12/2008 | Rashid et al. |
| 8,271,694 | B2 | 9/2012 | Sharp et al. |
| 8,625,427 | B1 | 1/2014 | Terry et al. |
| 10,095,645 | B2 | 10/2018 | Davis et al. |
| 10,303,635 | B2 | 5/2019 | Itkin |
| 10,318,312 | B2 | 6/2019 | Itkin et al. |
| 10,387,358 | B2 | 8/2019 | Oved |
| 10,515,066 | B2 | 12/2019 | Shattah et al. |
| 10,642,780 | B2 | 5/2020 | Shuler et al. |
| 2008/0147904 | A1 | 6/2008 | Freimuth et al. |
| 2008/0270599 | A1 | 10/2008 | Tamir et al. |
| 2009/0031070 | A1 | 1/2009 | Purcell et al. |
| 2009/0144508 | A1 | 6/2009 | Freimuth et al. |
| 2009/0172301 | A1* | 7/2009 | Ebersole ............... G06F 15/16 711/E12.001 |
| 2010/0070677 | A1* | 3/2010 | Thakkar ............... G06F 9/45558 711/6 |
| 2011/0246724 | A1* | 10/2011 | Marathe ............... G06F 9/467 711/147 |
| 2014/0129741 | A1 | 5/2014 | Shahar et al. |
| 2014/0181454 | A1* | 6/2014 | Manula ............... G06F 12/1027 711/170 |
| 2016/0070598 | A1* | 3/2016 | Vadkerti ............... G06F 9/5077 718/104 |
| 2018/0004703 | A1 | 1/2018 | Sharma et al. |
| 2018/0232334 | A1* | 8/2018 | Oved ............... G06F 13/4282 |
| 2021/0124590 | A1 | 4/2021 | Itkin et al. |

OTHER PUBLICATIONS

Oved, "RDMA and User Space Ethernet Bonding," PowerPoint Presentation, OpenFabrics Alliance, 12th Annual Workshop, pp. 1-16, Apr. 2016.

Shochat, "Multi-PCIe Socket Network Device," PowerPoint Presentation, Netdev 2.2, The Technical Conference on Linux Networking, Seoul, Korea, pp. 1-25, Nov. 2017, as downloaded from https://slidetodoc.com/multipcie-socket-network-device-achiad-shochat-netdev-2/.

Smolyar et al., "IOctopus: Outsmarting Nonuniform DMA," Proceedings of the 25th International Conference on Architectural Support for Programming Languages and Operating Systems (ASPLOS'20), pp. 1-15, year 2020.

Pismenny et al., "Autonomous NIC Offloads," Proceedings of the 26th ACM International Conference on Architectural Support for Programming Languages and Operating Systems (ASPLOS'21), pp. 18-35, year 2021.

Shochat, "Multi-PCIe Socket Network Device," Conference Paper, Netdev 2.2, The Technical Conference on Linux Networking, Seoul, Korea, pp. 1-4, Nov. 2017.

Wikipedia, "Non-Uniform Memory Access," pp. 1-9, last edited May 20, 2019.

Lameter, "NUMA (Non-Uniform Memory Access): AnOverview," ACM Queue, vol. 11, No. 7, pp. 1-12, year 2013.

* cited by examiner

MULTI-SOCKET NETWORK INTERFACE CONTROLLER WITH CONSISTENT TRANSACTION ORDERING

CROSS-REFERENCE TO RELATED APPLICATION

This application claims the benefit of U.S. Provisional Patent Application 63/186,124, filed May 9, 2021, which is incorporated herein by reference.

FIELD OF THE INVENTION

The present invention relates generally to packet network communications, and particularly to devices and methods for linking multiple processors to communicate over a packet communication network.

BACKGROUND

A network interface controller (NIC) typically comprises one or more ports for connection to a packet network and at least one bus interface for connection to the peripheral component buses of one or more host processors. In modern, high-speed NICs, the ports may comprise high-speed Ethernet or InfiniBand ports, for example, while the bus interface or interfaces comprise Peripheral Component Interconnect Express (PCIe) endpoints. (In the context of InfiniBand networks, this sort of NIC is also referred to as a Host Channel Adapter, or HCA.)

Some NICs have multiple bus interfaces, which may connect to different, respective host computers or, in some cases, to the same host computer. The latter configuration is useful, for example, in interfacing with host computers having a NUMA (non-uniform memory access) architecture. Such computers comprise multiple interconnected processing nodes (also referred to as "sockets"), wherein each node comprises a central processing unit (CPU), having one or more processing cores, and a local memory. Each CPU can access both its own local memory and non-local memories, belonging to other CPUs, but local memory access is generally much faster than non-local access. A NIC with multiple bus interfaces can be configured and connected so that each NUMA node has its own bus interface, and the NIC is thus able to load data directly into and read data directly from the local memory of the CPU producing or consuming the data.

As an example of a NIC with multiple bus interfaces, U.S. Pat. No. 10,387,358, whose disclosure is incorporated herein by reference, describes a multi-PCIe socket NIC operating system interface. A plurality of PCIe endpoints of a multi-socket network interface device are attached to a host for exchanging ingress traffic and egress traffic. An operating system of the host includes a bonding/teaming module having a plurality of network interfaces. The bonding/teaming module is configured to select one of the endpoints for the egress traffic. The network interface device has a hardware bond module configured to steer the ingress traffic to designated ones of the endpoints.

SUMMARY

Embodiments of the present invention that are described hereinbelow provide improved network interface devices and methods for operation of such devices.

There is therefore provided, in accordance with an embodiment of the invention, computing apparatus, which includes a host computer, including at least one central processing unit (CPU), a host memory, and at least first and second host bus interfaces for connection to at least first and second peripheral component buses, respectively. A network interface controller (NIC) includes a network port, for connection to a packet communication network, and first and second NIC bus interfaces, configured to communicate via the first and second peripheral component buses with the first and second host bus interfaces, respectively. Packet processing logic is coupled between the network port and the first and second NIC bus interfaces and is configured, in response to packets received through the network port, to write data to the host memory concurrently via both the first and second NIC bus interfaces in a sequence of direct memory access (DMA) transactions, and after writing the data in any given DMA transaction in the sequence, to write a completion report to the host memory with respect to the given DMA transaction while verifying that the completion report will be available to the CPU only after all the data in the given DMA transaction have been written to the host memory.

In some embodiments, the packet processing logic is configured to receive messages including the packets in multiple, different work queues, to associate each of the work queues with a respective completion queue, and to write the completion report to the respective completion queue. In one embodiment, the packet processing logic is configured to associate each work queue with a respective, preselected one of the NIC bus interfaces, such that the DMA transactions invoked by the messages received in each work queue are carried out through the associated one of the NIC bus interfaces. For each work queue, the packet processing logic is configured to write the completion report to the respective completion queue through the same preselected one of the NIC bus interfaces after writing the data in the given DMA transaction.

In another embodiment, the packet processing logic is configured to carry out the DMA transactions invoked by the messages received in at least one of the work queues by writing data through the first and second NIC bus interfaces, and after writing the data, to write completion reports with respect to the DMA transactions through the first and second NIC bus interfaces to respective first and second completion buffers in the host memory. A driver program running on the host computer is configured to read the completion reports from the first and second completion buffers and to arrange the completion reports in a single completion queue.

In yet another embodiment, the packet processing logic is configured to carry out the DMA transactions invoked by the messages received in a given work queue by writing first data through the first NIC bus interface and writing second data through the second NIC bus interfaces, and after writing the first and second data, to write completion reports with respect to the DMA transactions through the first and second NIC bus interfaces while incrementing respective, first and second completion counter values in the host memory. A driver program running on the host computer is configured to apply the counter values in validating the completion reports in the respective completion queue that is associated with the given work queue.

In some embodiments, the host computer includes multiple non-uniform memory access (NUMA) nodes, including first and second NUMA nodes respectively including the first and second host bus interfaces, wherein the host memory includes first and second local memories disposed respectively in the first and second NUMA nodes. In a disclosed embodiment, the packet processing logic is configured to receive a definition of a memory region extending over respective first and second parts of the first and second local memories and to receive a memory mapping with respect to the memory region that is applicable to both the first and second local memories, and to apply the memory mapping in writing the data in the DMA transactions via both of the first and second NIC bus interfaces to the respective first and second parts of the first and second local memories.

In one embodiment, the DMA transactions include at least first and second atomic read-modify-write operations executed respectively via the first and second NIC bus interfaces, and the packet processing logic is configured, after executing the first atomic read-modify-write operation, to execute a fencing read operation via the first NIC bus interface and to initiate execution of the second atomic read-modify-write operation only after completion of the fencing read operation.

Additionally or alternatively, the DMA transactions include a memory region invalidation operation executed via the first NIC bus interface, and the packet processing logic is configured, after executing the memory region invalidation operation, to execute a fencing read operation via the first NIC bus interface and to initiate further DMA transactions via the second NIC bus interface only after completion of the fencing read operation.

There is also provided, in accordance with an embodiment of the invention, computing apparatus, which includes a host computer, including multiple non-uniform memory access (NUMA) nodes, including at least first and second NUMA nodes, which respectively include first and second central processing units (CPUs), first and second local memories, and first and second host bus interfaces for connection to first and second peripheral component buses, respectively. A network interface controller (NIC) includes a network port, for connection to a packet communication network, and first and second NIC bus interfaces, configured to communicate via the first and second peripheral component buses with the first and second host bus interfaces, respectively. Packet processing logic is coupled between the network port and the first and second NIC bus interfaces and is configured to receive a definition of a memory region extending over respective first and second parts of the first and second local memories and to receive a memory mapping with respect to the memory region that is applicable to both the first and second local memories, and to apply the memory mapping in writing data to the memory region via both the first and second NIC bus interfaces in a sequence of direct memory access (DMA) transactions to the respective first and second parts of the first and second local memories in response to packets received through the network port.

In a disclosed embodiment, the memory region includes multiple pages, including one or more first pages mapped to the respective first part of the first local memory and one or more second pages mapped to the respective second part of the second local memory.

Additionally or alternatively, the host processor includes an inter-processor bus between the first and second NUMA nodes, and the packet processing logic is configured to write at least a portion of the data in the sequence of the DMA transactions via the first NIC bus interface and the inter-processor bus to the second local memory. Further additionally or alternatively, the packet processing logic is configured to select one of the first and second NIC bus interfaces to use in each of the DMA transactions in the sequence so as to balance a communication load between the first and second peripheral component buses.

There is additionally provided, in accordance with an embodiment of the invention, a method for computing, which includes connecting a network interface controller (NIC) to communicate with a host computer, having a central processing unit (CPU) and a host memory, via at least first and second peripheral component buses. Packets are received from a network through a network port of the NIC. In response to the packets received through the network port, data are written from the NIC to the host memory concurrently via both the first and second buses in a sequence of direct memory access (DMA) transactions. After writing the data in any given DMA transaction in the sequence, a completion report is written with respect to the given DMA transaction from the NIC to the host memory via one of the first and second buses while verifying that the completion report will be available to the CPU only after all the data in the given DMA transaction have been written to the host memory.

There is further provided, in accordance with an embodiment of the invention, a method for computing, which includes connecting a network interface controller (NIC) to communicate via at least first and second peripheral component buses with at least first and second non-uniform memory access (NUMA) nodes, respectively, of a host computer, the first and second NUMA nodes respectively including first and second central processing units (CPUs) and first and second local memories. The NIC receives a definition of a memory region extending over respective first and second parts of the first and second local memories and a memory mapping with respect to the memory region that is applicable to both the first and second local memories. Packets are received from a network through a network port of the NIC. In response to the packets received through the network port, the memory mapping is applied in writing data to the memory region via both the first and second peripheral component buses in a sequence of direct memory access (DMA) transactions to the respective first and second parts of the first and second local memories.

The present invention will be more fully understood from the following detailed description of the embodiments thereof, taken together with the drawings in which:

DETAILED DESCRIPTION OF EMBODIMENTS

Overview

When a NIC with multiple bus interfaces is connected to a host computer, each bus interface will appear to the host hardware as a separate physical device, even when all the bus interfaces are connected to the same network port. This complex hardware configuration can pose serious challenges to programmers and creates difficulty in exploiting the full available bandwidth of the NIC. It is therefore desirable that the NIC driver running on the host computer present the NIC as a single logical device, exposing a single instance of each of the network ports to software, irrespective of the physical bus interface that is actually used in a given communication. The host operating system will then assign a single network address to each port for use by application programs running on the host computer, while enabling the NIC processing logic and driver to optimize the use of the available bus interface resources in performing direct memory access (DMA) operations to and from the host memory.

When a NIC with a single bus interface performs DMA operations, the inherent ordering rules of the host peripheral component bus, such as a PCIe bus, ensure that transactions are carried out in the proper order. For example, if the NIC writes data over the bus to the host memory and then writes a completion notification over the bus to notify the host processor that the data are ready for consumption, the ordering rules of the bus will ensure that the host processor does not receive the completion notification until the data write has actually been completed. On the other hand, when the NIC uses multiple bus interfaces concurrently, it is possible that the completion notification will reach the host processor via one bus interface before the data write has been completed, over another bus interface, leading the host processor to read incorrect data.

Embodiments of the present invention that are described herein provide techniques that enable a NIC of this sort, with multiple bus interfaces, to maintain proper ordering of DMA transactions, while automatically optimizing the use of bus resources and presenting itself to the host application software as a single, unified network interface device. A "DMA transaction," in the context of the present description and in the claims, refers to a complete DMA input/output (I/O) operation, such as an operation in which a specified range of data is read from or written to the host memory. A DMA transaction is typically performed in response to a work request, such as a read or write request from a local or remote requester, which specifies the range of data to be transferred. An I/O device, such as a NIC, executes the work request by performing a data transfer or a sequence of data transfers over a bus. The present embodiments provide techniques that can be implemented in NIC hardware and driver software and ensure that applications using the resources of the NIC will receive data and notifications, such as completion reports, in the proper order notwithstanding the use of multiple buses in transferring the data and notifications.

The present embodiments are implemented in computing apparatus that comprises a host computer and a NIC. The host computer comprises at least one central processing unit (CPU), a host memory, and at least two host bus interfaces for connection to corresponding peripheral component buses. The NIC comprises a network port (or multiple ports), for connection to a packet communication network, and at least two NIC bus interfaces, which communicate via the corresponding peripheral component buses with the host bus interfaces. In response to packets received through the network port, packet processing logic in the NIC writes data to the host memory concurrently via both of the NIC bus interfaces in a sequence of DMA transactions.

In some embodiments, after writing the data in any given DMA transaction in the sequence, the packet processing logic writes a completion report to the host memory with respect to the given DMA transaction while verifying that the completion report will be available to the CPU only after all the data in the given DMA transaction have been written to the host memory. Typically, the packet processing logic receives messages in multiple, different work queues, and associates each of the work queues with a respective completion queue, to which it writes the corresponding completion reports. (Each "message" in this context comprises a single packet or a sequence of packets.)

In one embodiment, proper ordering of the DMA transactions and completion reports is ensured by associating each work queue with a respective, preselected bus interface of the NIC, such that the DMA transactions invoked by the messages received in each work queue are carried out through the associated bus interface. After writing the data in any given DMA transaction, the packet processing logic then writes the completion report to the respective completion queue through this same NIC bus interface. Consequently, transaction ordering rules of the peripheral component bus will ensure that the completion report is delivered only after completion of the data transfer.

In other embodiments, the packet processing logic may carry out the DMA transactions invoked by messages in a given work queue through multiple NIC bus interfaces, for example to facilitate load balancing between the buses. To ensure proper ordering of the DMA transactions and completion reports in one such embodiment, the packet processing logic writes the completion reports over each bus to a corresponding completion buffer in the host memory. A driver program running on the host computer reads and arranges the completion reports in a single completion queue in the proper order. Alternatively or additionally, the packet processing logic increments a respective completion counter value for each bus in the host memory each time it writes a completion report to the host memory. The driver program applies these counter values in validating the completion reports before making them available to host application software.

Some embodiments described herein are directed particularly to enhancing the efficiency of data delivery to NUMA nodes that are served by a NIC over multiple, respective buses. For example, in performing Remote DMA (RDMA) operations in any given work queue, the NIC typically uses a memory mapping that is defined with respect to a memory region in the host memory that is assigned to the work queue. Conventionally, the memory region is defined within a single physical memory, and the mapping applies to a single peripheral component bus. In NUMA applications, however, it can be useful to write and read data for a given work queue to the local memories of two or more NUMA nodes.

To address this need in an embodiment of the present invention, the packet processing circuitry in the NIC receives and uses definitions of memory regions that extend over respective parts of the local memories of two or more different NUMA nodes. In other words, one or more of the pages in a given memory region are mapped to a part of one local memory, while another page or pages in the memory region are mapped to a part of another local memory. The packet processing circuitry applies the memory mapping in writing data to the memory region in a sequence of DMA transactions via the bus interfaces that connect to each of the NUMA nodes to which respective parts of the memory region are mapped.

This arrangement enables the NIC to use the same memory translation table over multiple NUMA nodes and buses and thus enhances the efficiency of the NIC in distributing and executing the DMA transactions. For example, the packet processing logic may select the NIC bus interfaces to use in each DMA transaction so as to balance the communication load between the buses. Although the NIC will typically write and read data to and from the local memory in each NUMA node through the bus that connects to that NUMA node, in some cases the NIC may write data over a bus that is connected to a given NUMA node, and the data are then transferred to a destination in a different NUMA node over an inter-processor bus between the nodes.

The embodiments that are described hereinbelow relate mainly to host computers with NUMA architectures, and provide techniques that can be applied in optimizing the use of available bus bandwidth while maintaining proper transaction ordering in this context. The principles of the present invention, however, are by no means limited to NUMA architectures and can be applied, as well, in other applications of NICs having multiple bus interfaces that are connected to the same memory controller. This sort of arrangement is advantageous, for example, in increasing the data communication speed of the host computer when the network interface port or ports of the NIC have a higher bandwidth than a single bus interface can offer. All such alternative applications and embodiments are considered to be within the scope of the present invention.

System Description

Figure 1:
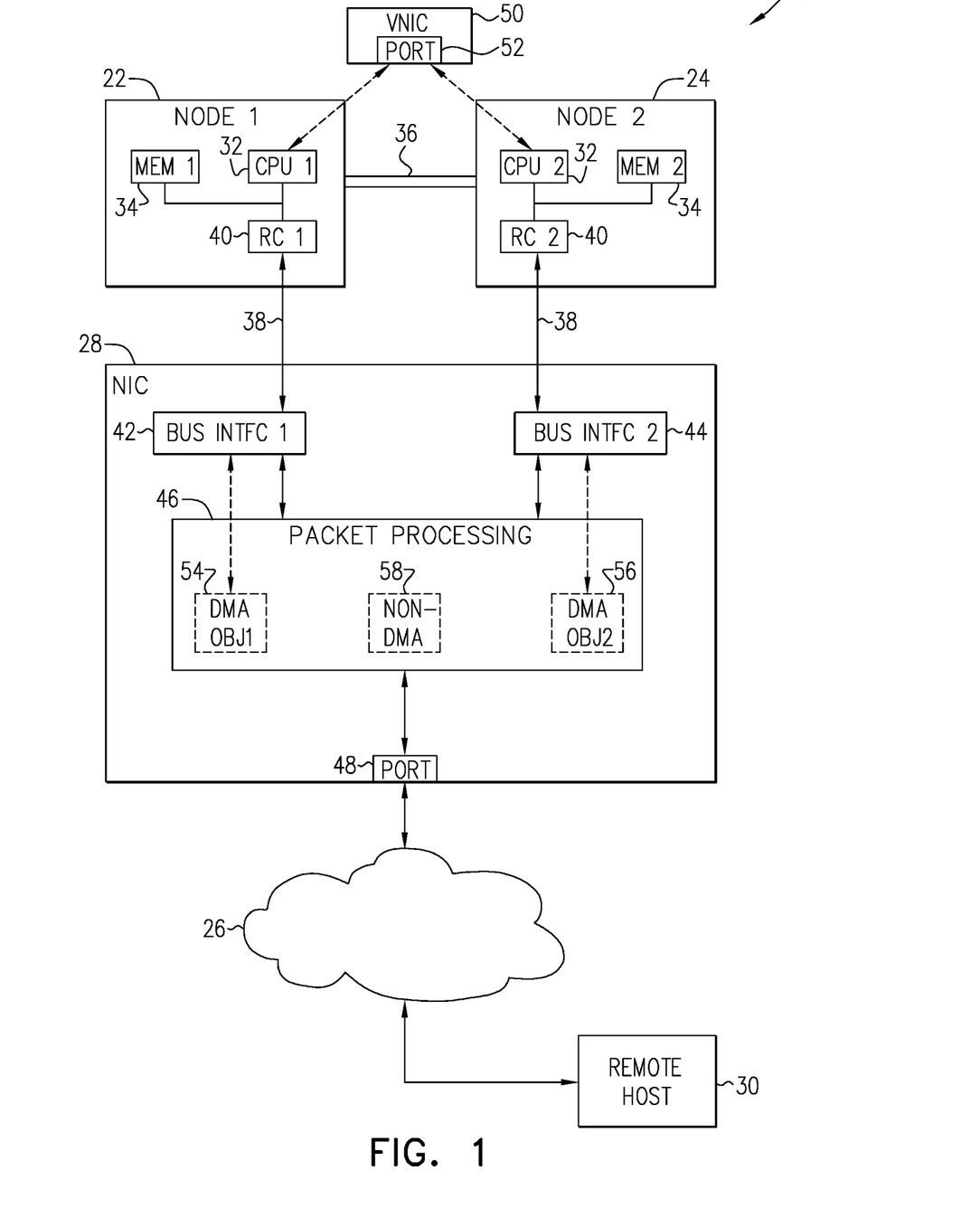
FIG. 1 is block diagram that schematically illustrates a host computer comprising a NIC with multiple bus interfaces, in accordance with an embodiment of the invention.

FIG. 1 is block diagram that schematically illustrates a host computer 20 comprising a NIC 28 with multiple bus interfaces 42, 44, in accordance with an embodiment of the invention. Host computer comprises two NUMA nodes 22, 24, each comprising a respective central processing unit (CPU) 32 and a local memory 34. (For the sake of simplicity, the host memory of computer 20 is shown as comprising local memories 34. In practice, the host memory typically comprises both main and cache memories, and may comprise other physical memories, as well, which are not shown in the figures.) NUMA nodes 22 and 24 are interconnected by an inter-processor bus 36. Root complexes (RC) 40 serve as host bus interfaces for connection to respective peripheral component buses 38, for example PCIe buses. Although host computer 20 in this example comprises two NUMA nodes, the features described hereinbelow may similarly be implemented in host computers comprising three or more NUMA nodes, in which two or more of the NUMA nodes have respective host bus interfaces.

NIC 28 comprises a network port 48, or possibly multiple network ports (not shown in the figures), for connection to a packet communication network 26. For example, network 26 may comprise an Ethernet or InfiniBand switch fabric, and port 48 comprises suitable physical layer (PHY) and media access control (MAC) interface circuits for connection to the network. NIC 28 transmits and receives data packets over network 26 to and from other network nodes, such as a remote host 30. NIC bus interfaces 42, 44 comprise PCIe interface logic, for example, and communicate via respective buses 38 with respective root complexes 40.

Packet processing logic 46 is coupled between network port 48 and NIC bus interfaces 42, 44. In response to packets received through network port 48, packet processing logic 46 writes data to memories 34 concurrently via both of NIC bus interfaces 42, 44 in a sequence of direct memory access (DMA) transactions. In other DMA transactions, packet processing logic 46 reads data from memories 34 and transmits the data in packets via network port 48. Typically, packet processing logic 46 comprises digital logic circuits, which may be hard-wired or programmable and are configured to carry out the functions described herein. Additionally or alternatively, packet processing logic 46 may comprise one or more programmable processors, which are programmed in software to carry out at least some of these functions.

To manage and maintain order among the DMA transfers, packet processing logic 46 partitions the objects used in interaction with host computer 20 into DMA objects 54, 56 and non-DMA objects 58. The DMA objects in the present embodiment are partitioned into groups, shown as DMA objects 54 and DMA objects 56, and each group is associated with a respective NIC bus interface 42, 44. Typically, objects that invoke DMA write and read operations to and from memories 34, such as work queues and completion queues, are classified and grouped as DMA objects 54, 56, while ancillary objects that may be used to support DMA operations, such as memory regions and protection domains, are classified as non-DMA objects 58. The application of these classifications in maintaining transaction ordering is described further hereinbelow.

In some embodiments, each DMA object 54, 56 has an explicit attribute indicating the bus interface 42, 44 with which it is associated. Application software running on host computer 20 uses this attribute in choosing the DMA objects and bus interface through which it interacts with NIC 28. This approach, however, places an added burden on the application programmer and does not allow for automatic load balancing among the buses.

Therefore, in the pictured embodiment, driver software running on host computer 20, referred to herein as a driver 50, exposes a virtual NIC (VNIC) interface to application software, with a single virtual port 52 corresponding to physical port 48. Driver 50 manages the distribution of DMA objects 54 and 56 between bus interfaces 42 and 44, while ensuring proper ordering. This distribution can take into account considerations of locality on the one hand (i.e., matching the choice of bus interface 42, 44 to the location of the target memory 34, in NUMA node 22 or 24, for a given DMA object) and load balancing between buses 38 on the other. These features are typically transparent to the application programmer, and the application software is indifferent to the number of bus interfaces provided by the NIC hardware.

Maintaining Order of DMA Writes and Completion Reports

As explained above, one of the challenges in supporting efficient DMA operation of a NIC with multiple bus interfaces, such as NIC 28, is to ensure that information transferred by the NIC over buses 38 reaches CPUs 32 in the proper order. As a specific example, after writing the data in any given DMA transaction, packet processing logic 46 in the present embodiments writes a completion report to the host memory with respect to the given DMA transaction while verifying that the completion report will be available to the CPU only after all the data in the given DMA transaction have been written to the host memory. Embodiments of the present invention provide a number of techniques that can be used for this purpose, as illustrated in the figures that follow.

Figure 2:
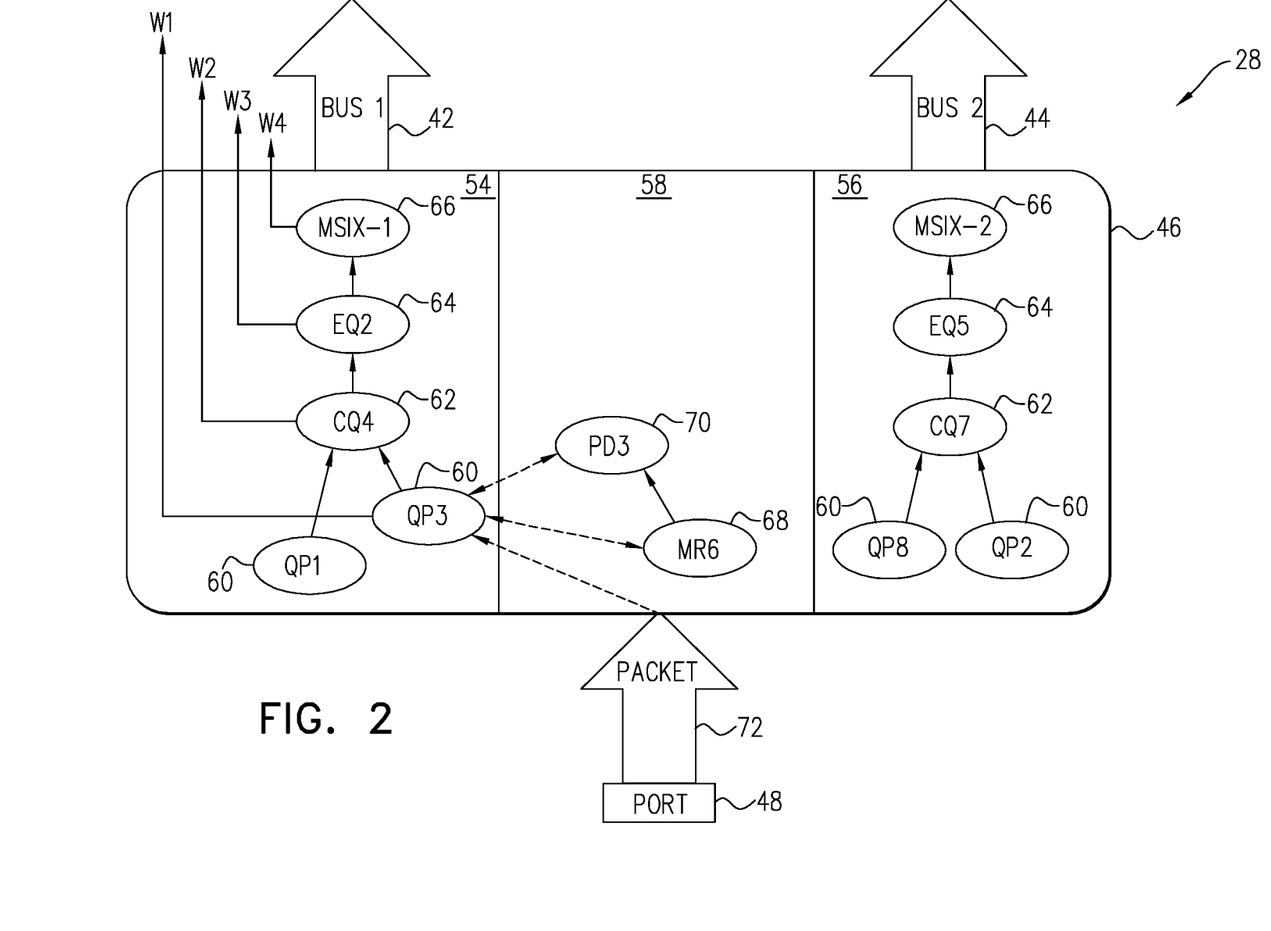
FIG. 2 is a block diagram that schematically illustrates the operation of packet processing logic in a NIC with multiple bus interfaces, in accordance with an embodiment of the invention.

FIG. 2 is a block diagram that schematically illustrates the operation of packet processing logic 46 in NIC 28, in accordance with an embodiment of the invention. This figure specifically illustrates the groupings of DMA objects 54 and 56, which are respectively associated with bus interfaces 42 and 44, as well as non-DMA objects 58. In the present embodiment, the groupings of DMA objects are used to maintain proper ordering of DMA transactions by ensuring that all DMA operations carried out by the DMA objects in a given group are performed in order through the same bus interface, i.e., all DMA objects 54 write data to memory 34 only via bus interface 42, while all DMA objects 56 write data only via bus interface 44.

DMA objects 54 and 56 include work queues, identified in the figures as queue pairs (QPs) 60, as well as completion queues (CQs) 62. Each QP 60 is associated with a given CQ 62, and multiple QPs can be associated with the same CQ. CQs 62 in this embodiment are classified as dependent objects, meaning that they are assigned to the same grouping as the QPs 60 that are associated with them. Thus, CQ4, which is associated with QP1 and QP3, is grouped with objects 54, while CQ 62 is grouped with objects 56 along with its associated QP2 and QP8. Each CQ 62 is associated with a given event queue (EQ) 64, and each event queue is associated with a message-signaled interrupt (MSIX) queue 66. (These associations may also be one-to-one or many-to-one.) Thus, EQs 64 and MSIX queues 66 are also classified as dependent objects and are thus assigned to the same groups of DMA objects as their parent QPs 60.

On the other hand, non-DMA objects 58, such as a memory region (MR) 68 and a protection domain (PD) 70, do not invoke DMA operations and thus need not be associated with a specific bus interface 42 or 44.

These illustrations of DMA objects and non-DMA objects are not meant to be exhaustive, and other objects used by packet processing logic 46 may be similarly grouped as necessary. For example, a shared receive queue will typically be classified as a DMA object, while a reliable datagram domain or an end-to-end context will be classified as a non-DMA object.

In the example shown in FIG. 2, NIC 28 receives a packet 72 via port 48 in a message directed to QP3. Packet processing logic 46 looks up context information regarding the applicable memory region (MR6) and protection domain (PD3), and then performs a DMA write operation (W1) to write the packet data via bus interface 42 to memory 34. After all the data in the message to which packet 72 belongs have been written to bus interface 42, packet processing logic will perform a second DMA write operation (W2) to write a completion report (referred to as a completion queue element, or CQE) to CQ4. The transaction ordering rules on bus 38 will then ensure that W1 is completed before W2, so that the CQE is written to memory 34 and thus becomes available to CPU 32 in node 22 (FIG. 1) only after all the message data have been written to the memory.

In similar fashion, after sending write operation W2 to bus interface 42, packet processing logic 46 will then write an event to the appropriate even queue 64 (EQ2) in a DMA write operation W3. Finally, packet processing logic 46 writes an interrupt to MSIX queue 66 (MSIX-1) in a DMA write operation W4. The same bus transaction ordering applies throughout.

Figure 3:
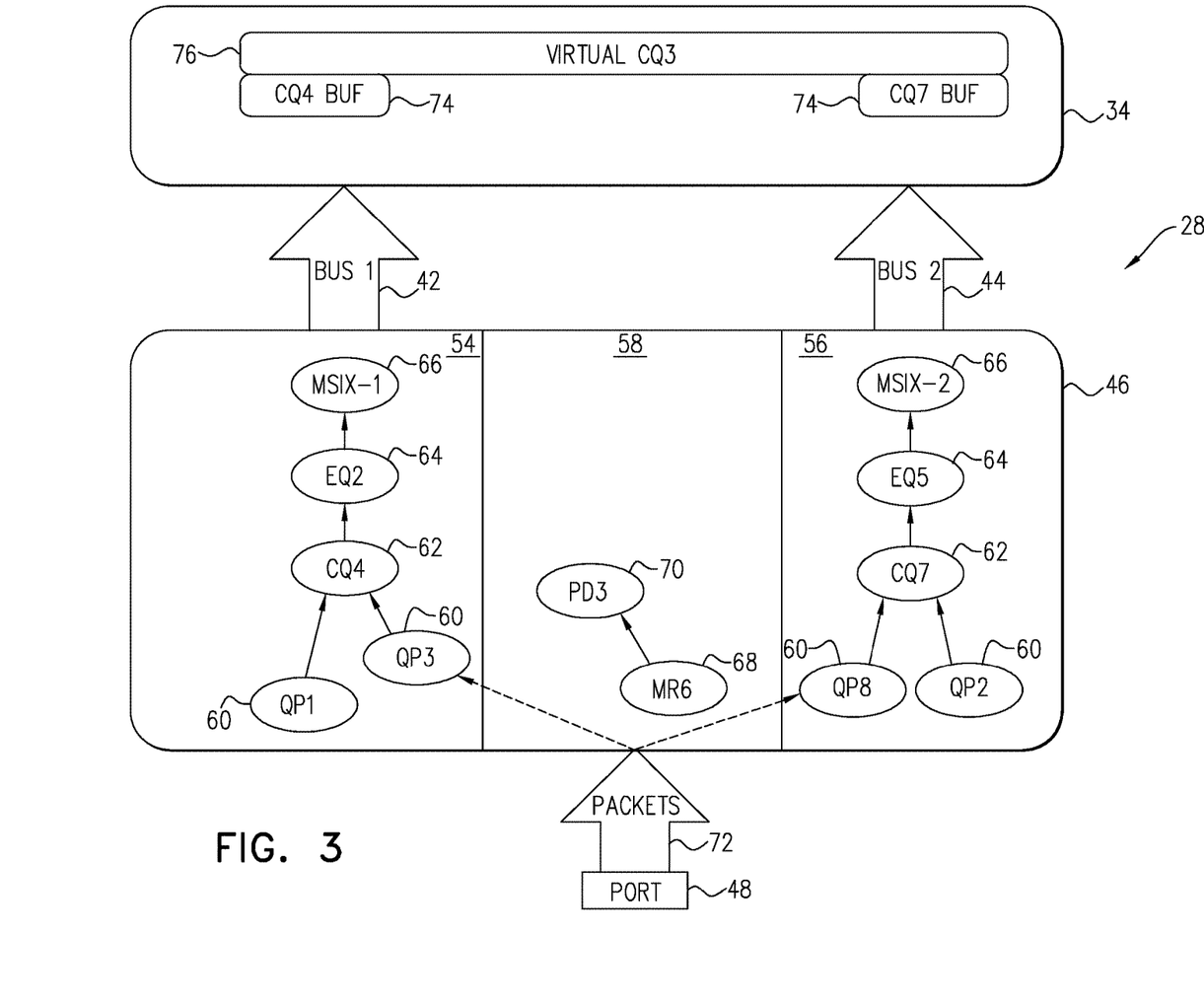
FIG. 3 is a block diagram that schematically illustrates the operation of packet processing logic in a NIC with multiple bus interfaces, in accordance with another embodiment of the invention.

FIG. 3 is a block diagram that schematically illustrates the operation of packet processing logic 46 in NIC 28, in accordance with another embodiment of the invention. This embodiment addresses a problem that may arise, for example, when application software creates many QPs, all sharing the same CQ. If the model shown in FIG. 2 were followed strictly in this sort of situation, all the QPs in question would have to be assigned to the same grouping of DMA objects and thus would use the same host bus interface, giving rise to a possible bottleneck in the interface between NIC 28 and host computer 20.

To address this problem and enable more effective load balancing between bus interfaces 42 and 44, driver 50 (FIG. 1) distributes QPs 60 that are created by the application software between the groups of DMA objects 54 and 56, and creates respective CQs 62 (labeled CQ4 and CQ7 respectively) for the two groups. Packet processing logic writes CQEs in CQ4 and CQ7 via buses 42 and 44, respectively, to respective completion buffers 74 in local memories 34 on node 22 and node 24. Driver 50 reads the CQEs from buffers 74 and arranges the CQEs in a single completion queue 76 (identified in FIG. 3 as virtual CQ3). Thus, NIC 28 is able to exploit the bandwidth of both host buses, while the use of buffers 74 and virtual completion queue 76 ensures that CQEs become available to the application software only after the corresponding DMA write transactions have actually been completed. The same approach can be applied to events and interrupts.

Figure 4:
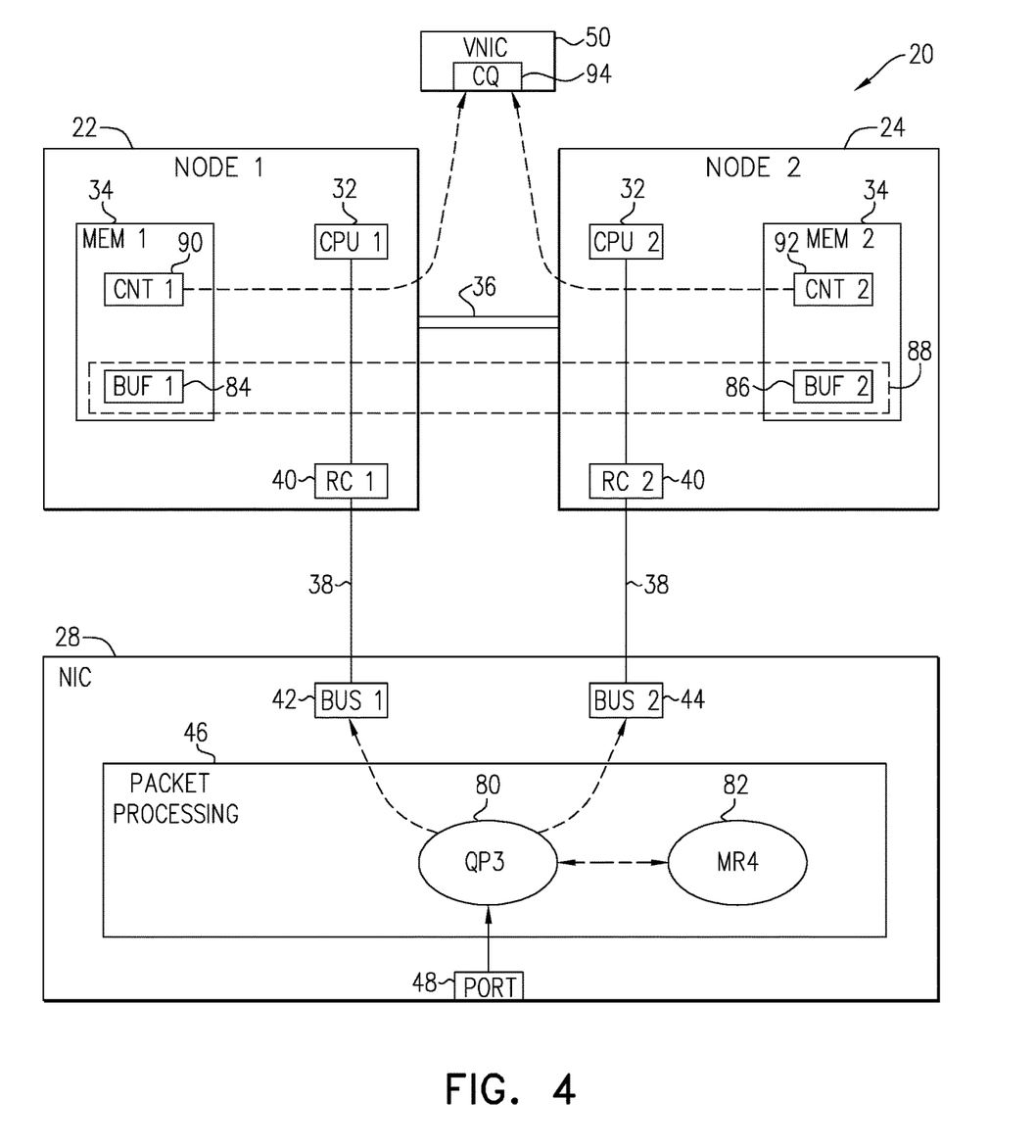
FIG. 4 is a block diagram that schematically illustrates the operation of a host computer and a NIC with multiple bus interfaces, in accordance with still another embodiment of the invention.

FIG. 4 is a block diagram that schematically illustrates the operation of host computer 20 and NIC 28, in accordance with still another embodiment of the invention. This embodiment addresses the need that arises in some situations to perform DMA transactions with respect to a single QP 80 (labeled QP3 in FIG. 4) via both bus interfaces 42 and 44. This need can arise, for example, when host computer 20 receives a large volume of incoming data on a single QP, with a bandwidth that may be greater than the capacity of a single bus interface.

Under such circumstances, packet processing logic 46 carries out DMA transactions invoked by the messages received on QP3 by writing data through both of bus interfaces 42 and 44. For example, packet processing logic 46 may apply a round-robin or other suitable load balancing strategy in choosing which bus interface to use in each DMA transaction. After writing the data in a given DMA transaction through a given bus interface, packet processing logic 46 then writes a CQE with respect to the DMA transaction to a CQ 94. Each time it writes a CQE via one of bus interfaces 42 or 44, packet processing logic 46 also increments the values of completion counters 90 and via both bus interfaces. The CQE contains the corresponding counter value.

Driver 50 reads and applies the values of counters 90 and 92 in validating the CQEs in CQ 94. Specifically, before making a CQE available to application software, driver 50 verifies that the value of completion counter 90 or 92 for the bus over which the CQE was written is equal to or greater than the counter value recorded in the CQE. This use of the counter values ensures that all DMA write operations that were initiated prior to writing the CQE to CQ 94 have actually been completed.

Shared Memory Regions

In the embodiment shown in FIG. 4, a single memory region 82 (labeled MR4) is defined for use by QP3, regardless of the bus interface 42 or 44 that is chosen for a particular DMA write operation. MR4 defines the translation to be applied by packet processing logic 46 between virtual address ranges specified by incoming RDMA messages and physical addresses in memories 34. In the present embodiment, MR4 specifies a mapping 88 that includes buffers 84 and 86 in local memories 34 of NUMA nodes 22 and 24 respectively.

Packet processing logic 28 applies mapping 88 in writing data in DMA transactions to buffers 84 and 86 via both of bus interfaces 42 and 44, in response to packets received from the network. For each page in MR4, a translation table indicates whether the page is mapped to buffer 84 or buffer 86, and thus enables the packet processing logic to choose the optimal bus to use for each transfer. An example memory translation table of this sort is shown below in Table I:

TABLE I

EXAMPLE MEMORY TRANSLATION TABLE

| Page index | Bus0 address | Bus1 address | Local bus # |
| --- | --- | --- | --- |
| 0 | 0x . . . | 0x . . . | 0 |
| 1 | 0x . . . | 0x . . . | 0 |
| 2 | 0x . . . | 0x . . . | 1 |
| 3 | 0x . . . | 0x . . . | 1 |

In this table, the first two pages of memory region 82 are located in local memory 34 of NUMA node 22, while the last two pages are located in the local memory of NUMA node 24. In most cases, packet processing logic 46 will choose the bus that connects directly to the corresponding NUMA node 22 or 24 where buffer 84 or 86 is located. In some cases, however, for example to improve load balancing, packet processing logic 46 may write data destined for buffer 86 via bus interface 38 to NUMA node 22, which then transfers the data to its destination via inter-processor bus 36.

Fencing of DMA Operations

In some embodiments, NIC 28 carries out atomic DMA read-modify-write operations via buses 38. In such transactions, packet processing logic 46 reads a value from a specified address in memory 34, modifies the value according to predefined instructions, and then writes the value back to the same address. When NIC 28 is able to access the host memory only via a single bus, transaction ordering rules on the bus ensure that subsequent DMA operations will be able to access the specified address only after the atomic operation has been completed. In the case of host computer 20 (FIGS. 1 and 4), however, it is possible that before a first atomic operation carried out on a first QP via one of the buses has finished writing a new value to a given address, the read phase of a subsequent atomic transaction carried out on another QP via the other bus will access the same address. In this case, the subsequent atomic operation will read the old value stored at the address and will thus generate an erroneous result.

To prevent this sort of error, after packet processing logic 46 executes an atomic read-modify-write operation via one of bus interfaces 42 and 44, the packet processing logic executes a fencing read operation via the same bus interface. Packet processing logic 46 will initiate subsequent atomic read-modify-write operations targeting the same address only after the fencing read operation has been completed. For the purpose of fencing read operations, driver 50 allocates a memory address to be used as the target of such operations, and maps this address for DMA access via both of interfaces 42 and 44. Completion of the fencing read operation following an atomic operation guarantees that the write phase of the atomic operation has been completed before the read phase of the next atomic operation can take place.

Figure 5:
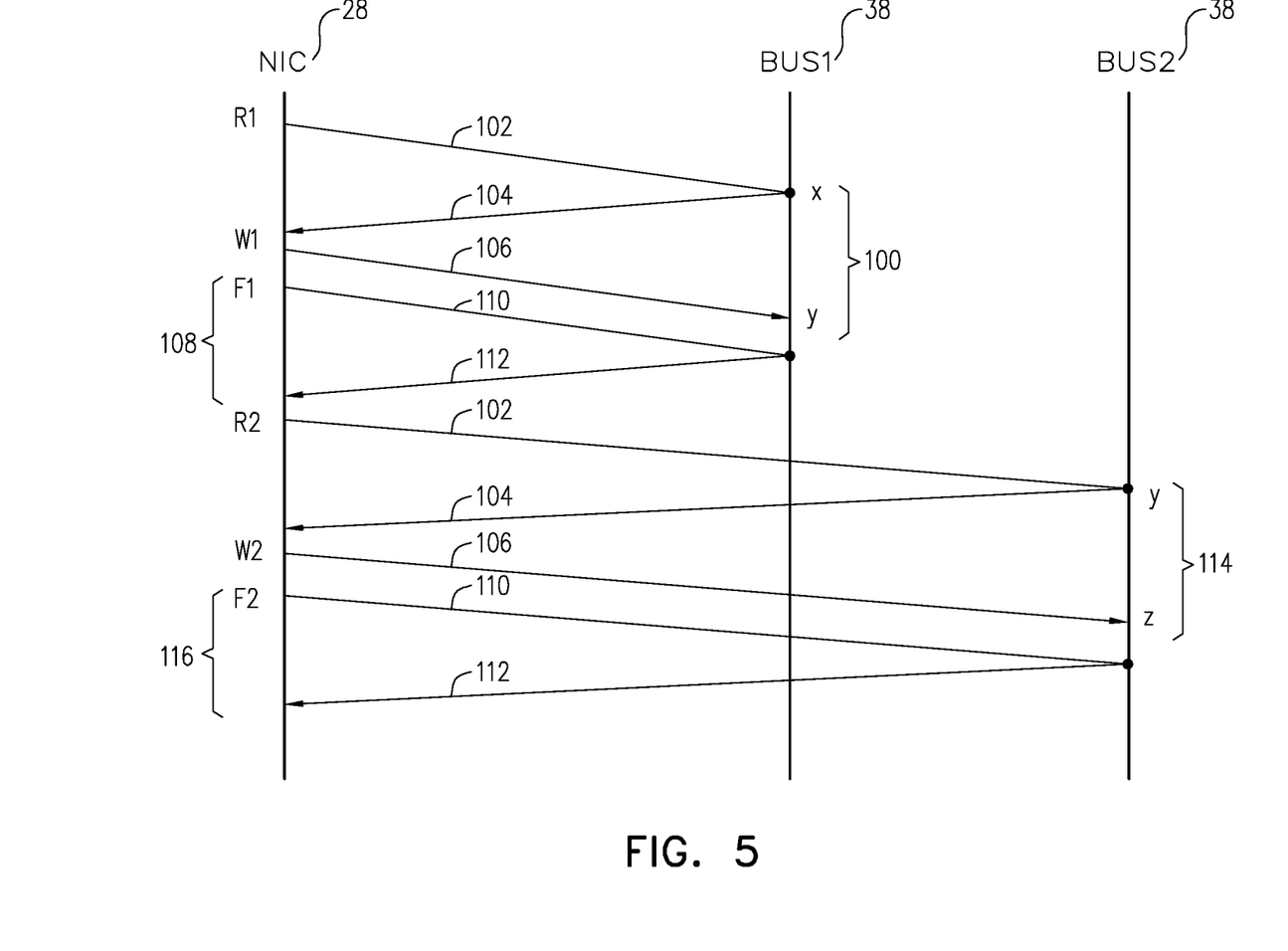
FIG. 5 is a ladder diagram that schematically illustrates a method for handling of atomic operations in a NIC with multiple bus interfaces, in accordance with another embodiment of the invention.

FIG. 5 is a ladder diagram that schematically illustrates a method for handling of atomic operations in NIC 28 using a fencing read operation, in accordance with another embodiment of the invention. In an initial atomic operation 100 carried out over one of buses 38 (labeled Bus1 in the figure), NIC 28 issues a read command 102 with respect to an address in memory 34. NIC 28 then receives data 104 from the address with the value x and issues a write command 106 to write the modified data value y back to the address. NIC 28 then initiates a fencing read operation 108 over Bus1, including a read command 110 and a response 112. In accordance with PCIe ordering rules, fencing read operation 108 flushes all preceding write operations to memory, meaning that NIC 28 will receive response 112 only after all preceding write operations, including write command 106, have been completed.

Only after receiving response 112 in fencing read operation 108 does NIC 28 initiate a second atomic operation 114 on Bus2 targeting the same address as atomic operation 100. In operation 114, NIC 28 reads the (correct) value y from the address in memory 34 that was the target of atomic operation 100, and then writes a modified value z back to the address. Atomic operation 114 is similarly followed by a fencing read operation 116 on Bus2. Each atomic operation is retired only after the corresponding fencing read operation is completed.

Fencing read operations 108 and 116 may be initiated by NIC 28 immediately after each atomic operation 100, 114 that it carries out. This approach, however, can add unnecessary latency when multiple atomic operations are executed in succession via the same bus, since fencing reads are not needed in this situation to ensure proper transaction ordering. Therefore, in an alternative embodiment, NIC 28 initiates the fencing read operation following a given atomic operation on one of buses 38 only upon receiving a request to carry out a subsequent atomic operation targeting the same address on another bus. (Multiple atomic operations may be conducted over multiple busses concurrently without issuing fencing reads if they target different addresses.)

A similar problem can arise in handling memory region invalidation operations. Once a memory region has been invalidated, the corresponding memory buffer is freed and can be overwritten. An invalidation command issued over a given bus will flush all prior write commands to memory, meaning that no further data will remain on the bus to be written to the buffer in question after invalidation. When NIC 28 is connected to host memory 34 via multiple buses, however, an earlier write command on one bus may still write data to a given buffer after a memory invalidation operation of the buffer has been completed via the other bus.

Figure 6:
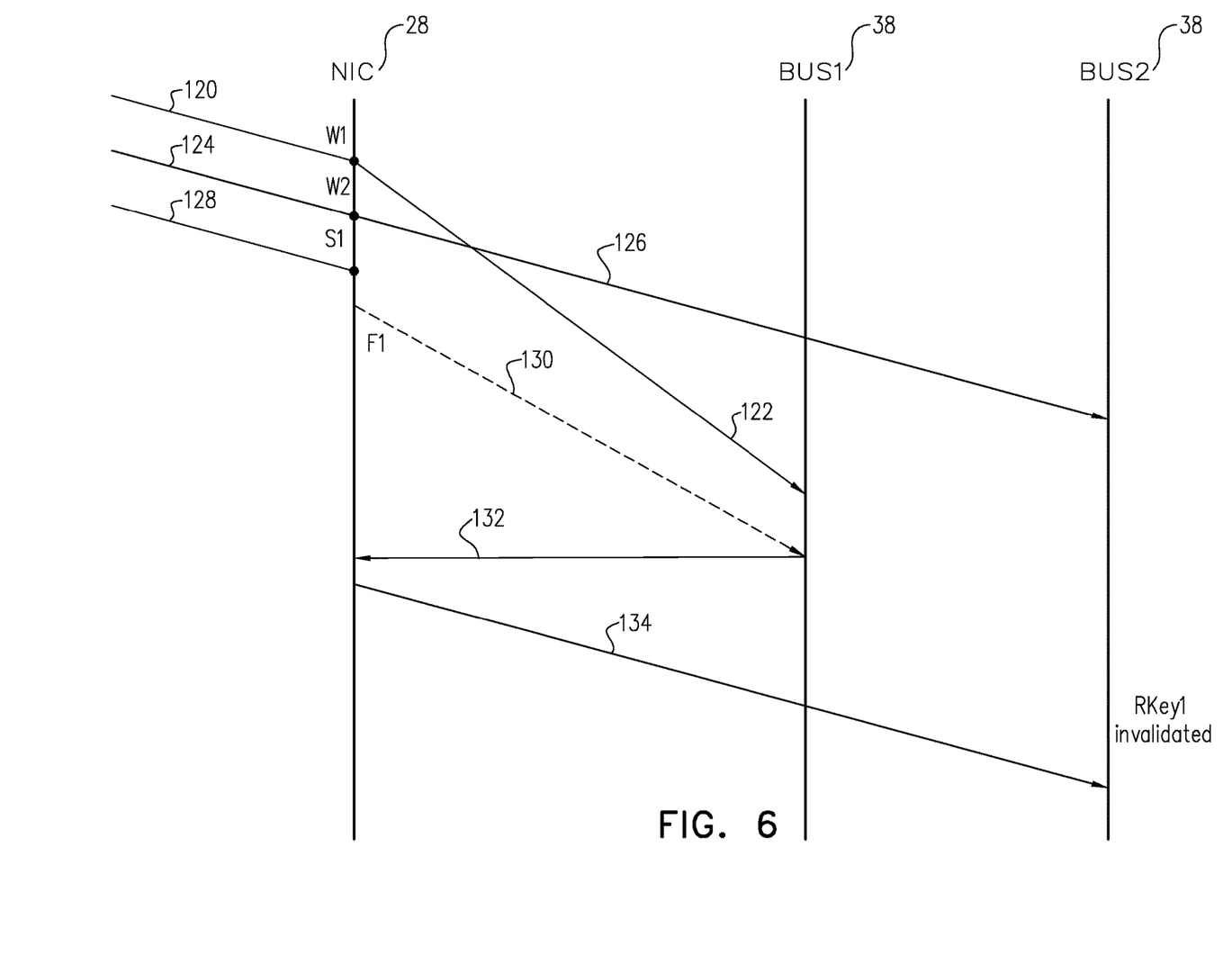
FIG. 6 is a ladder diagram that schematically illustrates a method for handling of memory region invalidation in a NIC with multiple bus interfaces, in accordance with another embodiment of the invention.

FIG. 6 is a ladder diagram that schematically illustrates a method for handling of memory region invalidation in NIC 28 with multiple bus interfaces 42, 44, in accordance with another embodiment of the invention. This embodiment also makes use of fencing read operations. In the pictured scenario, NIC 28 receives a first RDMA write request 120 directed to a given memory region (MR1), and consequently issues a DMA write command 122 over Bus1 to write data to the corresponding buffer in memory 34. NIC 28 then receives a second RDMA write request 124 directed to MR1, and issues a DMA write command 126 to write data over Bus1. In the pictured example, command 126 is executed before command 122, for example because of traffic on Bus1.

NIC 28 now receives an invalidation instruction 128, for example in the form of a send-and-invalidate packet, as is known in the art, instructing the NIC to invalidate MR1. In response to instructions 128, NIC 28 invalidates MR1, but prior to sending an invalidation completion report, NIC 28 initiates a fencing read operation, by sending a fencing read command 130 over Bus1. The corresponding fencing read response 132 indicates to NIC 28 that all previous write commands have been flushed from Bus1. After receiving fencing read response 132, NIC 28 sends an invalidation completion report 134 over Bus2 to indicate that the corresponding memory key (RKey1) is no longer valid.

Memory de-registration and local invalidations are handled similarly: After invalidating the corresponding memory regions, NIC 28 issues a fencing read before generating a completion report.

The embodiments described above demonstrate a number of different techniques that can be used to solve problems in operation of a NIC having multiple host bus interfaces. Although all of these techniques are described, for the sake of clarity and concreteness, with reference to the architecture of host computer 20 and NIC 28 that is shown and described above, the principles of these techniques may be applied, *mutatis mutandis*, in other sorts of multi-socket architectures. The techniques described above may be used together in the same host computer or, alternatively, only a subset of these techniques may be applied. All such alternative implementations and applications are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
  a host computer, comprising at least one central processing unit (CPU), a host memory, and at least first and second host bus interfaces for connection to at least first and second peripheral component buses, respectively; and
  a network interface controller (NIC), comprising:
    a network port, for connection to a packet communication network;
    first and second NIC bus interfaces, configured to communicate via the first and second peripheral component buses with the first and second host bus interfaces, respectively; and
    packet processing logic, which is coupled between the network port and the first and second NIC bus interfaces and is configured, in response to packets received through the network port, to write data to the host memory concurrently via both the first and second NIC bus interfaces in a sequence of direct memory access (DMA) transactions, and after writing the data in any given DMA transaction in the sequence, to write a completion report to the host memory with respect to the given DMA transaction while verifying that the completion report will be available to the CPU only after all the data in the given DMA transaction have been written to the host memory,
  wherein the packet processing logic is configured to receive messages comprising the packets in multiple, different work queues maintained by the NIC, to associate each of the work queues with a respective completion queue, and to write the completion report to the respective completion queue in the host memory,
  wherein the packet processing logic is configured to associate each work queue with a respective, preselected one of the NIC bus interfaces, such that the DMA transactions invoked by the messages received in each work queue are carried out through the associated one of the NIC bus interfaces, and
  wherein for each work queue, the packet processing logic is configured to write the completion report to the respective completion queue through the same preselected one of the NIC bus interfaces after writing the data in the given DMA transaction.

2. The apparatus according to claim 1, wherein the host computer comprises multiple non-uniform memory access (NUMA) nodes, including first and second NUMA nodes respectively comprising the first and second host bus interfaces, wherein the host memory comprises first and second local memories disposed respectively in the first and second NUMA nodes.

3. The apparatus according to claim 2, wherein the packet processing logic is configured to receive a definition of a memory region extending over respective first and second parts of the first and second local memories and to receive a memory mapping with respect to the memory region that is applicable to both the first and second local memories, and to apply the memory mapping in writing the data in the DMA transactions via both of the first and second NIC bus interfaces to the respective first and second parts of the first and second local memories.

4. The apparatus according to claim 1, wherein the DMA transactions comprise at least first and second atomic read-modify-write operations executed respectively via the first and second NIC bus interfaces, and
  wherein the packet processing logic is configured, after executing the first atomic read-modify-write operation, to execute a fencing read operation via the first NIC bus interface and to initiate execution of the second atomic read-modify-write operation only after completion of the fencing read operation.

5. The apparatus according to claim 1, wherein the DMA transactions comprise a memory region invalidation operation executed via the first NIC bus interface, and
  wherein the packet processing logic is configured, after executing the memory region invalidation operation, to execute a fencing read operation via the first NIC bus interface and to initiate further DMA transactions via the second NIC bus interface only after completion of the fencing read operation.

6. Computing apparatus, comprising:
  a host computer, comprising at least one central processing unit (CPU), a host memory, and at least first and second host bus interfaces for connection to at least first and second peripheral component buses, respectively; and
  a network interface controller (NIC), comprising:
    a network port, for connection to a packet communication network;
    first and second NIC bus interfaces, configured to communicate via the first and second peripheral component buses with the first and second host bus interfaces, respectively; and packet processing logic, which is coupled between the network port and the first and second NIC bus interfaces and is configured, in response to packets received through the network port, to write data to the host memory concurrently via both the first and second NIC bus interfaces in a sequence of direct memory access (DMA) transactions, and after writing the data in any given DMA transaction in the sequence, to write a completion report to the host memory with respect to the given DMA transaction while verifying that the completion report will be available to the CPU only after all the data in the given DMA transaction have been written to the host memory, wherein the packet processing logic is configured to receive messages comprising the packets in multiple, different work queues maintained by the NIC, to associate each of the work queues with a respective completion queue, and to write the completion report to the respective completion queue in the host memory, wherein the packet processing logic is configured to carry out the DMA transactions invoked by the messages received in at least one of the work queues by writing data through the first and second NIC bus interfaces, and after writing the data, to write completion reports with respect to the DMA transactions through the first and second NIC bus interfaces to respective first and second completion buffers in the host memory, and wherein a driver program running on the host computer is configured to read the completion reports from the first and second completion buffers and to arrange the completion reports in a single completion queue.

7. The apparatus according to claim 6, wherein the host computer comprises multiple non-uniform memory access (NUMA) nodes, including first and second NUMA nodes respectively comprising the first and second host bus interfaces, wherein the host memory comprises first and second local memories disposed respectively in the first and second NUMA nodes.

8. The apparatus according to claim 7, wherein the packet processing logic is configured to receive a definition of a memory region extending over respective first and second parts of the first and second local memories and to receive a memory mapping with respect to the memory region that is applicable to both the first and second local memories, and to apply the memory mapping in writing the data in the DMA transactions via both of the first and second NIC bus interfaces to the respective first and second parts of the first and second local memories.

9. The apparatus according to claim 6, wherein the DMA transactions comprise at least first and second atomic read-modify-write operations executed respectively via the first and second NIC bus interfaces, and wherein the packet processing logic is configured, after executing the first atomic read-modify-write operation, to execute a fencing read operation via the first NIC bus interface and to initiate execution of the second atomic read-modify-write operation only after completion of the fencing read operation.

10. The apparatus according to claim 6, wherein the DMA transactions comprise a memory region invalidation operation executed via the first NIC bus interface, and wherein the packet processing logic is configured, after executing the memory region invalidation operation, to execute a fencing read operation via the first NIC bus interface and to initiate further DMA transactions via the second NIC bus interface only after completion of the fencing read operation.

11. Computing apparatus, comprising:

a host computer, comprising at least one central processing unit (CPU), a host memory, and at least first and second host bus interfaces for connection to at least first and second peripheral component buses, respectively; and a network interface controller (NIC), comprising:

a network port, for connection to a packet communication network;

first and second NIC bus interfaces, configured to communicate via the first and second peripheral component buses with the first and second host bus interfaces, respectively; and packet processing logic, which is coupled between the network port and the first and second NIC bus interfaces and is configured, in response to packets received through the network port, to write data to the host memory concurrently via both the first and second NIC bus interfaces in a sequence of direct memory access (DMA) transactions, and after writing the data in any given DMA transaction in the sequence, to write a completion report to the host memory with respect to the given DMA transaction while verifying that the completion report will be available to the CPU only after all the data in the given DMA transaction have been written to the host memory, wherein the packet processing logic is configured to receive messages comprising the packets in multiple, different work queues maintained by the NIC, to associate each of the work queues with a respective completion queue, and to write the completion report to the respective completion queue in the host memory, wherein the packet processing logic is configured to carry out the DMA transactions invoked by the messages received in a given work queue by writing first data through the first NIC bus interface and writing second data through the second NIC bus interfaces, and after writing the first and second data, to write completion reports with respect to the DMA transactions through the first and second NIC bus interfaces while incrementing respective, first and second completion counter values in the host memory, and wherein a driver program running on the host computer is configured to apply the counter values in validating the completion reports in the respective completion queue that is associated with the given work queue.

12. The apparatus according to claim 11, wherein the host computer comprises multiple non-uniform memory access (NUMA) nodes, including first and second NUMA nodes respectively comprising the first and second host bus interfaces, wherein the host memory comprises first and second local memories disposed respectively in the first and second NUMA nodes.

13. The apparatus according to claim 12, wherein the packet processing logic is configured to receive a definition of a memory region extending over respective first and second parts of the first and second local memories and to receive a memory mapping with respect to the memory region that is applicable to both the first and second local memories, and to apply the memory mapping in writing the data in the DMA transactions via both of the first and second NIC bus interfaces to the respective first and second parts of the first and second local memories.

14. The apparatus according to claim 11, wherein the DMA transactions comprise at least first and second atomic read-modify-write operations executed respectively via the first and second NIC bus interfaces, and wherein the packet processing logic is configured, after executing the first atomic read-modify-write operation, to execute a fencing read operation via the first NIC bus interface and to initiate execution of the second atomic read-modify-write operation only after completion of the fencing read operation.

15. The apparatus according to claim 11, wherein the DMA transactions comprise a memory region invalidation operation executed via the first NIC bus interface, and wherein the packet processing logic is configured, after executing the memory region invalidation operation, to execute a fencing read operation via the first NIC bus interface and to initiate further DMA transactions via the second NIC bus interface only after completion of the fencing read operation.

16. A method for computing, comprising:

connecting a network interface controller (NIC) to communicate with a host computer, having a central processing unit (CPU) and a host memory, via at least first and second peripheral component buses;

receiving packets from a network through a network port of the NIC;

in response to the packets received through the network port, writing data from the NIC to the host memory concurrently via both the first and second buses in a sequence of direct memory access (DMA) transactions; and after writing the data in any given DMA transaction in the sequence, writing a completion report with respect to the given DMA transaction from the NIC to the host memory via one of the first and second buses while verifying that the completion report will be available to the CPU only after all the data in the given DMA transaction have been written to the host memory, wherein receiving the packets comprises receiving messages comprising the packets in multiple, different work queues maintained by the NIC, wherein writing the completion report comprises associating each of the work queues with a respective completion queue, and writing the completion report to the respective completion queue in the host memory, wherein writing the data comprises associating each work queue with a respective, preselected one of the peripheral component buses, such that the DMA transactions invoked by the messages received in each work queue are carried out through the associated one of the peripheral component buses, and wherein writing the completion report comprises, for each work queue, writing the completion report to the respective completion queue through the same preselected one of the peripheral component buses after writing the data in the given DMA transaction.

17. The method according to claim 16, wherein the host computer comprises multiple non-uniform memory access (NUMA) nodes, including first and second NUMA nodes respectively comprising the first and second host bus interfaces, wherein the host memory comprises first and second local memories disposed respectively in the first and second NUMA nodes.

18. The method according to claim 17, and comprising receiving in the NIC a definition of a memory region extending over respective first and second parts of the first and second local memories and a memory mapping with respect to the memory region that is applicable to both the first and second local memories, and wherein writing the data comprises applying the memory mapping in writing the data in the DMA transactions via both of the first and second NIC bus interfaces to the respective first and second parts of the first and second local memories.

19. The method according to claim 16, wherein the DMA transactions comprise at least first and second atomic read-modify-write operations executed respectively via the first and second peripheral component buses, and wherein the method comprises, after executing the first atomic read-modify-write operation, executing a fencing read operation via the first peripheral component bus and initiating execution of the second atomic read-modify-write operation only after completion of the fencing read operation.

20. The method according to claim 16, wherein the DMA transactions comprise a memory region invalidation operation executed via the first peripheral component bus, and wherein the method comprises, after executing the memory region invalidation operation, executing a fencing read operation via the first NIC bus interface and initiating further DMA transactions via the second peripheral component bus only after completion of the fencing read operation.

* * * * *